Figure 7:
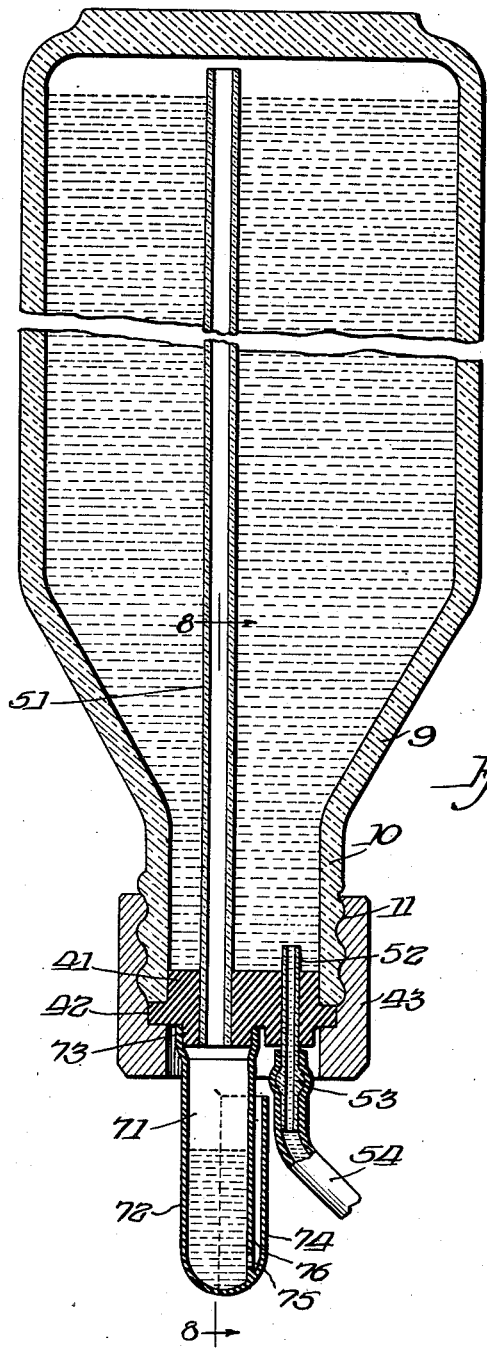

Nov. 9, 1943.　　　M. C. SCHWAB　　　2,333,685
DISPENSING AND PACKAGING DEVICE FOR STERILE LIQUIDS
Filed Aug. 18, 1941　　　5 Sheets-Sheet 1
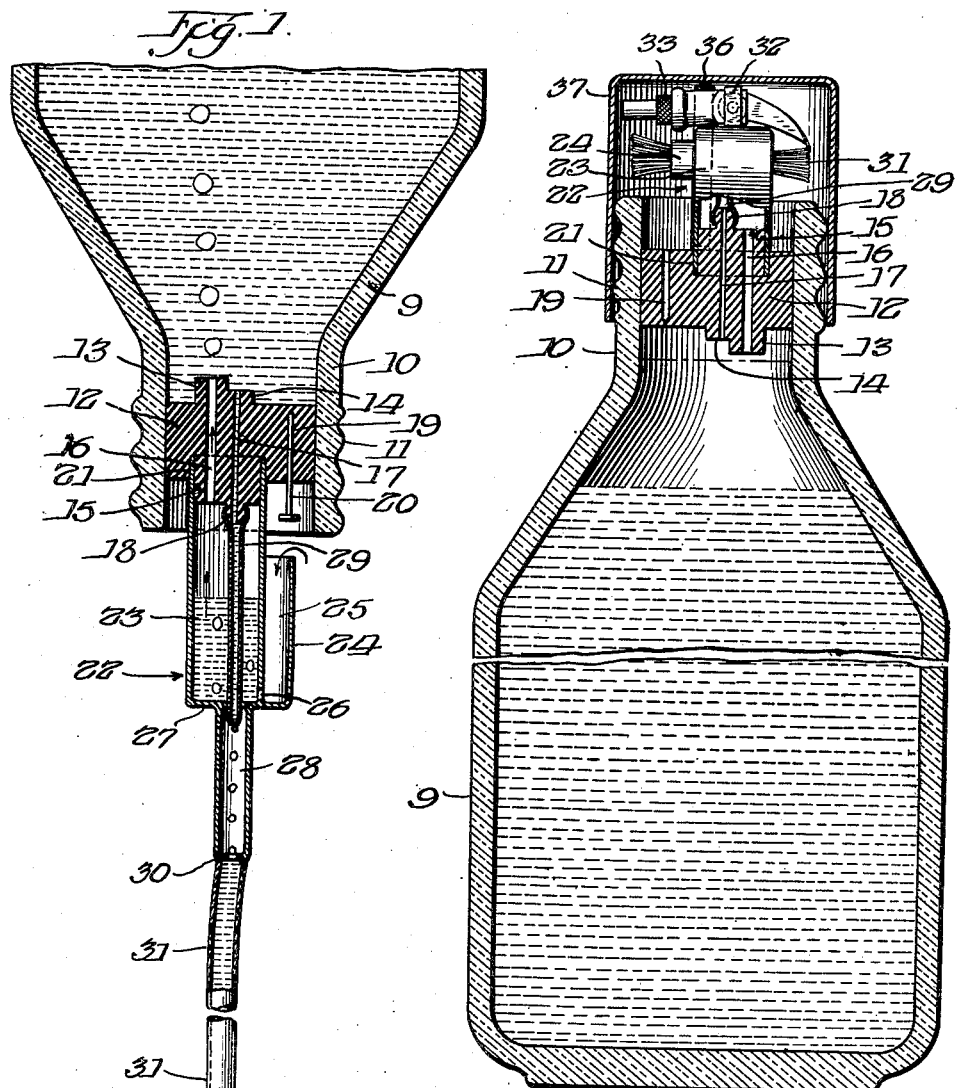
Inventor:
Martin C. Schwab
By: Paul Carpenter
Atty.

Nov. 9, 1943.  M. C. SCHWAB  2,333,685
DISPENSING AND PACKAGING DEVICE FOR STERILE LIQUIDS
Filed Aug. 18, 1941  5 Sheets-Sheet 2
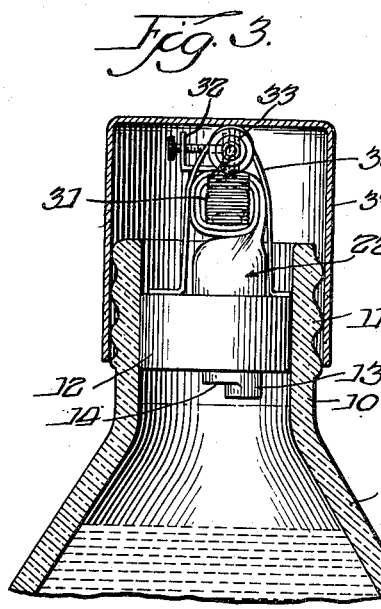
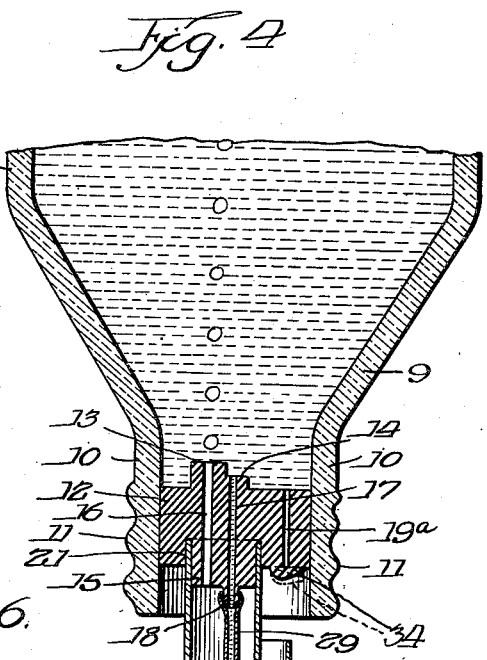
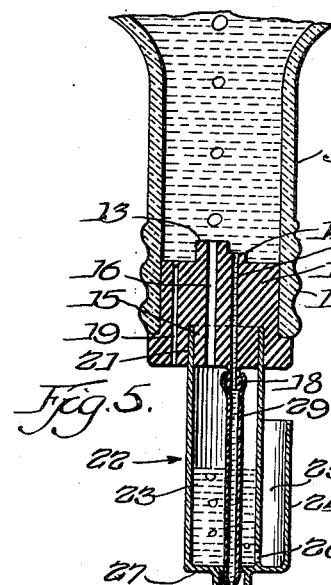
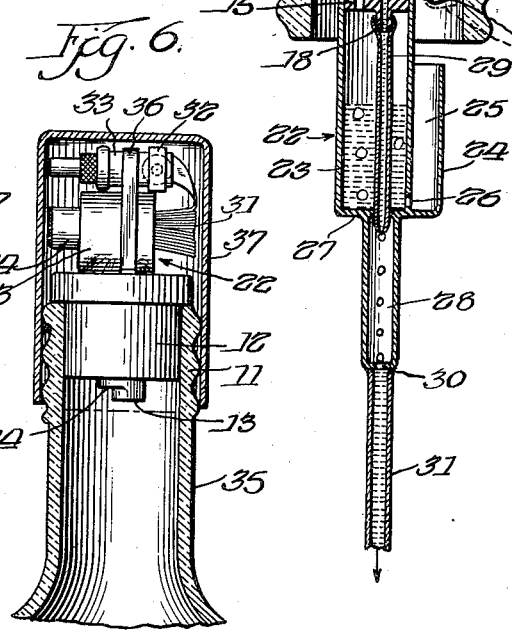
Inventor:
Martin C. Schwab.
By Paul Carpenter
Atty.

Nov. 9, 1943. M. C. SCHWAB 2,333,685
DISPENSING AND PACKAGING DEVICE FOR STERILE LIQUIDS
Filed Aug. 18, 1941 5 Sheets-Sheet 3

Inventor:
Martin C. Schwab.
By Paul Carpenter
Atty.

Nov. 9, 1943.  M. C. SCHWAB  2,333,685
DISPENSING AND PACKAGING DEVICE FOR STERILE LIQUIDS
Filed Aug. 18, 1941  5 Sheets-Sheet 4
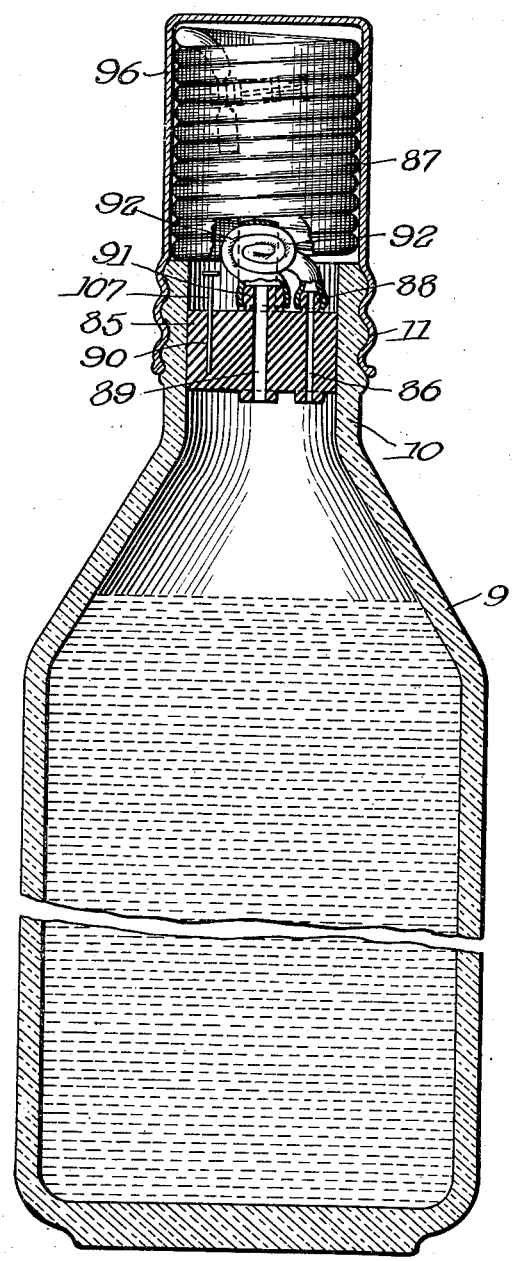
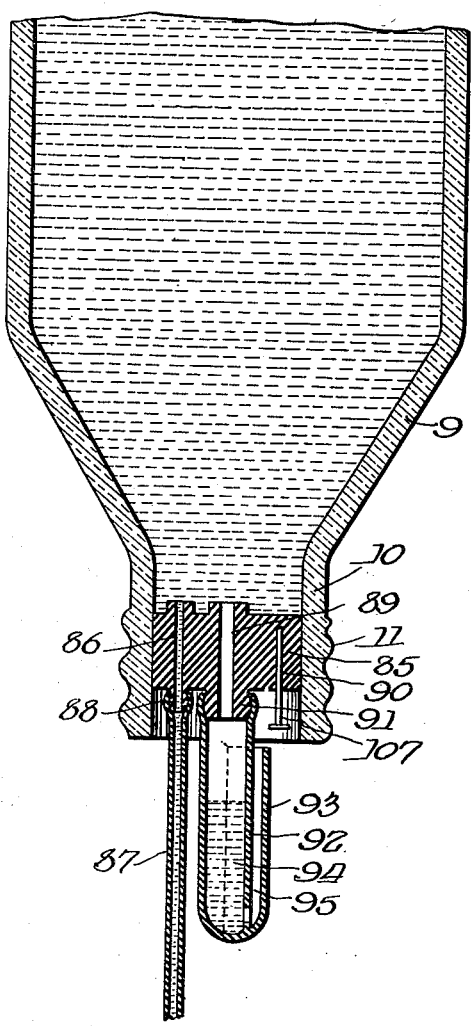
Inventor:
Martin C. Schwab.
By Paul Carpenter
Atty.

Nov. 9, 1943. M. C. SCHWAB 2,333,685
DISPENSING AND PACKAGING DEVICE FOR STERILE LIQUIDS
Filed Aug. 18, 1941 5 Sheets-Sheet 5
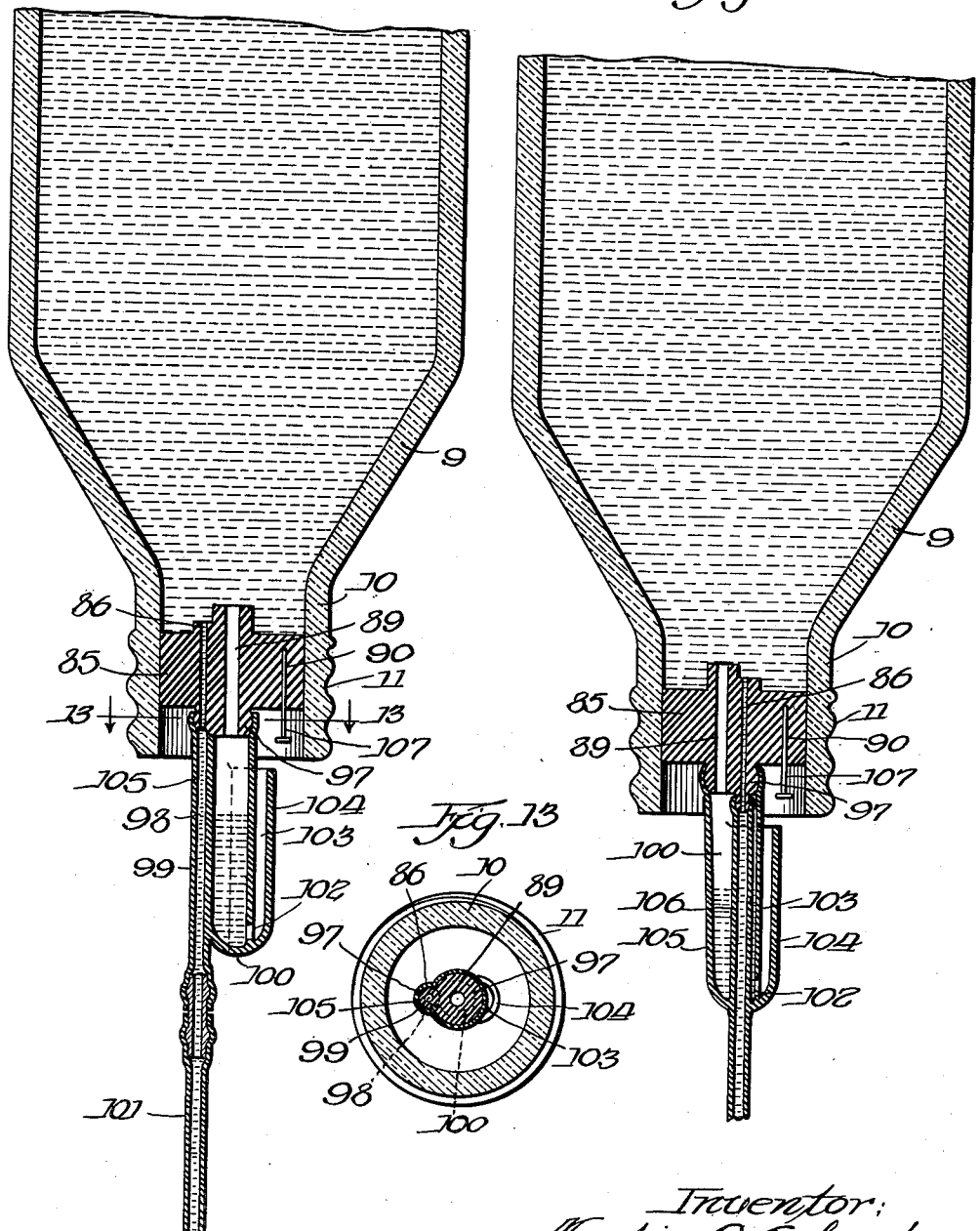
Inventor:
Martin C. Schwab:
By: Paul Carpenter
Atty.

Patented Nov. 9, 1943

2,333,685

UNITED STATES PATENT OFFICE 2,333,685

DISPENSING AND PACKAGING DEVICE FOR STERILE LIQUIDS

Martin C. Schwab, Chicago, Ill.

Application August 18, 1941, Serial No. 407,258

17 Claims. (Cl. 128—214)

This invention relates to liquid dispensing apparatus and more particularly to devices for dispensing sterile liquids for subcutaneous or intravenous injections or like uses. In the continuous withdrawal of liquids from containers generally, it is necessary that air or other gas or fluid be permitted to enter the container to replace the liquid withdrawn, and in devices to be employed for the purposes herein specifically pointed out, it is particularly important that the air entering the container upon withdrawal of the liquid be filtered or washed in order to prevent contamination of the sterile liquids within the container.

The practice of injecting liquids intravenously, subcutaneously or intramuscularly into tissue is well known to medical science, and it is also well known that the introduction of aseptic medicinal liquid for this purpose may be dangerous to the patient, owing to the possibility of foreign matter in the form of dust, spores and other impurities becoming entrained in the liquid to be injected from the air with which the liquid comes in contact within the container, thus rendering the liquid septic and unfit for injection purposes.

A primary object of the invention is to provide improved apparatus for washing the incoming air or gas prior to its entry into the liquid containers. A further object of the invention is to provide liquid dispensing apparatus in which a portion of the liquid to be dispensed serves as the medium for washing incoming air. Further objects are to provide a device of this type of simple construction and which may be readily sterilized and assembled.

A further particularly important object of the invention is the provision of a unitary package which includes the previously sterilized dispensing apparatus. It will be seen that the dispensing apparatus including a dispensing tube may be delivered in a sealed package to hospitals or other users and the device rendered ready for use by removing the housing shell, and the tape retaining the folded dispensing tube in position, without again sterilizing the dispensing apparatus or tube which are preferably sterilized at a central distributing point when the sterile liquid is placed in the container.

The invention relates generally to the subject matter of my patents numbered 2,156,313 and 2,156,314, issued on May 2, 1939, and is a continuation-in-part of my copending application, Serial No. 384,131, filed March 19, 1941. The present invention may be considered as an improvement over the devices shown in my issued patents set forth above in that the employment of closure caps formed of aluminum or molded plastics which are now difficult to obtain due to the urgency of the national defense program, have been eliminated. A further important feature of the invention is the fact that the liquid contents of the container are not exposed to the atmosphere from the time the liquid is placed in the container until it is dispensed, while in similar devices known to the art employing dispensing caps, the liquid is exposed to the dust and bacteria of the atmosphere when the closure seal is removed and the dispensing cap applied. The improved dispensing device in its operative position presents a minimum number of joints affording seats for dust or bacteria.

It will be understood that the invention may be employed in connection with other liquid dispensing devices other than in the field of utility particularly specified, and it therefore finds a wide industrial field of utility wherever it is desired to dispense a sterile or uncontaminated liquid.

Figure 8:
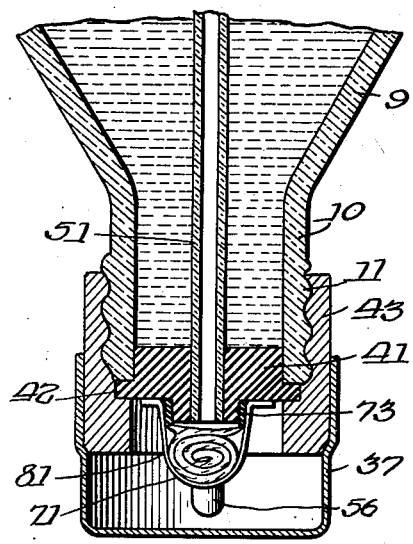
Figure 9:
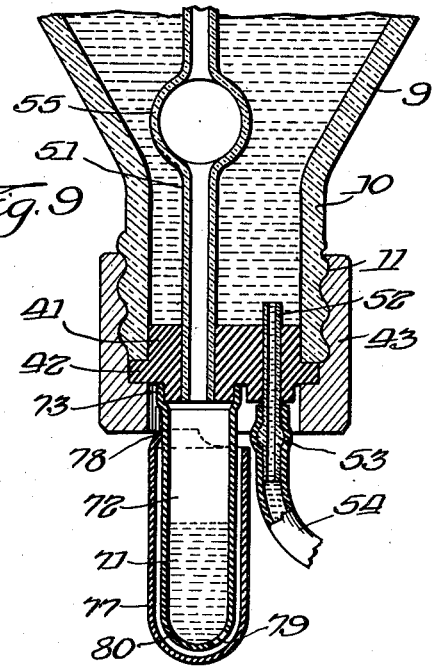

The invention will be readily understood from the following description in conjunction with the accompanying drawings wherein certain preferred embodiments of the invention are illustrated, in which:

Fig. 1 is a fragmentary, vertical, sectional view of a preferred embodiment of the invention;

Fig. 2, a broken, vertical, sectional view of the embodiment of Fig. 1 including the container and showing the dispensing and air washing apparatus in the form of a self-contained and unitary package;

Fig. 3, a fragmentary, vertical, sectional view, partly in elevation, of the embodiments of Figs. 1 and 2 taken at a 90° angle from the view in Fig. 2;

Fig. 4, a fragmentary, vertical, sectional view of a modified form of the invention;

Fig. 5, a fragmentary, vertical, sectional view of the invention employed upon a different type of liquid container;

Fig. 6, a fragmentary, vertical, sectional view, partly in elevation, of the embodiment of Fig. 5, showing the dispensing apparatus and liquid outlet tube in the form of a unitary package;

Fig. 7, a broken, vertical, sectional view of a modified form of the invention;

Fig. 8, a fragmentary, vertical, sectional view taken along the lines 8—8 of Fig. 7 and showing the device in packaged form;

Fig. 9, a fragmentary, vertical, sectional view of a further modification similar to that shown in Figs. 7 and 8;

Fig. 10, a broken, vertical, sectional view of a modification similar to that of Fig. 7 in packaged form;

Fig. 11, a fragmentary, vertical, sectional view of the embodiment of Fig. 10, showing the container in the inverted position;

Fig. 12, a fragmentary, vertical, sectional view of a further modification;

Fig. 13, a horizontal, sectional view along the lines 13—13 of Fig. 12; and

Fig. 14, a fragmentary, vertical, sectional view of a further modification.

Referring to the drawings, it will be seen that in Figs. 2, 3, 6 and 10, the container and the dispensing device are shown in the form of a package in their upright position, while in the remaining figures the container and dispensing device are shown in the inverted position, and it is to be understood that all of the embodiments illustrated dispense their liquid contents in the inverted position.

Referring to Figs. 1–6 of the drawings, the reference character 9 indicates a container, preferably made of glass, provided with a relatively wide neck 10 which may have external screw threads 11. Firmly seated within the neck 10 of the container by reason of a frictional engagement is a stopper member 12 having a paper liner impregnated with a heat-hardened synthetic resin on its inner surface, equipped with a boss 13 on its upper surface extending into the container, having a lower stepped portion 14 and a depending annular boss 15, the portions of the stopper adjacent the side walls of the boss 15 being slitted inwardly. A bulb-like member 18 depends from the lower surface of the boss 15.

A bore 16 extends through the stopper and through the boss 13 to form an inlet for incoming air to the interior of the container, as will be subsequently pointed out. Spaced from the bore 16 is a second bore 17 preferably of smaller diameter and so disposed that it extends through the depending boss 15, the bulb-like portion 18 and the stepped portion 14 of the upper boss.

The stopper is also provided with a third bore 19 of restricted diameter extending from the lower surface of the stopper 12 in its inverted position to a point adjacent the upper surface of the stopper. This bore 19 may be extended to open into the interior of the container by penetration of the remainder of the stopper by a needle. A pin 20 is preferably snugly inserted in the bore 19 to prevent the deposition of dust, moisture or other undesirable foreign substances therein.

The stopper 12 is preferably formed of a rather resilient rubber in order that the lower portion of the stopper may be bent to open the slitted extensions of the walls of the boss 15 and insert the upper portion 21 of a tubular member 22 which, when the stopper is permitted to return to its normal position, firmly secures the upper portion 21 of the tube 22 in the position shown in Fig. 1. If desired, a bit of cement may be applied to the upper portion 21 of the tube 22 to form a more secure engagement to the stopper 12.

The tubular member 22 is preferably formed of a non-fibrous material such as Pliofilm, a soft resilient rubber, moistureproof regenerated cellulose, cellulose acetate or a similar thin flexible material.

The elongated tube 22 is provided with several compartments. Directly below the air inlet line 16 is an air washing chamber 23, adapted to receive a portion of the liquid to be dispensed from the container, which portion serves as a washing medium for air entering the container. Adjacent the air washing chamber 23 is an auxiliary tube 24 forming an overflow chamber 25 for the air washing chamber 23 and connected therewith by the opening 26 in the tube wall adjacent its lower end. The overflow chamber 25 is open to the atmosphere at its upper end during the dispensing operation but may or may not be sealed with a puncturable membrane prior to the time when the liquid contents of the container are to be dispensed.

Disposed below the air washing chamber 23 and separated therefrom by a thin wall 27 is a drip chamber 28 adapted to receive the liquid content of the container as it is dispensed. A thin tube 29 of small diameter is suspended from the bulb-like member 18 by frictional engagement therewith and extends within the chamber 23 and through an opening in the tube wall 27 to convey the liquid to be dispensed to the drip chamber 28. The drip chamber may be of small diameter as shown in the drawings and in most cases a drip chamber similar to the well-known "Murphy drip" has been found most suitable and in which pools of the liquid are not formed. Secured to the lower open end 30 of the drip chamber 28 as by fusion is a thin tube 31 of soft rubber, Pliofilm or other flexible material adapted to convey the liquid to the point of use. The lower end of the tube 31 is provided with a clamp 32 to control the flow of liquid therethrough, and a tip 33 to receive an injection needle not shown. In some cases the drip chamber 28 may be omitted altogether, although it serves a useful purpose in enabling the operator to gauge the flow of liquid from the dispenser.

The embodiment of Fig. 4 is very similar to that of Figs. 1–3, the only difference being that the bore 19a extends completely through the stopper and is provided at its lower surface with a flap 34 of resilient rubber, which is normally closed and which is adapted to be temporarily opened to the position shown in the dotted lines in Fig. 4 by increase of pressure within the container, to relieve such pressure during the sterilization of the liquid and also to permit the addition of other liquids, such as blood, to the liquid within the container through a hollow needle by reason of the reduced pressure within the container prior to the dispensing operation.

Figs. 5 and 6 illustrate the invention when employed in a container having a long narrow neck 35 and a stopper 12 mounted on the end of the container neck 35, which may be employed interchangeably with a dispensing cap of the type shown in my Patent No. 2,156,314.

As shown in Figs. 2, 3 and 6, the invention may be employed in the form of a unitary package, particularly when the container is to be used for dispensing fluids for intravenous or subcutaneous injections such as physiological salt solutions, glucose solutions, blood for transfusion purposes and other fluids in the field of medicine or for related uses. In such cases, the container may be employed as a package for such fluids which are retained in sterile condition and are shipped in condition for immediate usage. As shown in Figs. 2, 3 and 6, the thin flexible dispensing tube 31 is readily adapted to be folded upon itself in the form of a fan and thus occupies very little space. The larger tubing 21 comprising the air washing chamber 23, the overflow chamber 25 and the drip chamber 28, may then be wrapped around the folded tube 31 to form a compact package. A strip 36 of tape, such as surgical gauze, may then be wrapped around the folded tubing to hold it in position above the stopper 12. A sterilized closure shell 37 of sheet material such as cardboard may then be frictionally fitted over the collar 10 of the container to enclose the package and to prevent damage to the dispensing assembly or the deposit of dust, etc., thereon.

The container 9 is preferably filled with the desired sterile liquid at a central distributing place to the extent shown in Fig. 2 before the stopper 12 and dispensing tubes are inserted. The air washing assembly, the stopper 12, the container and the liquid contents are thoroughly sterilized by heating to a suitable temperature before the closure 37 is applied. For example, the dispensing tubing 22 is first inserted in the stopper 12 by spreading the stopper so that its slitted portions receive the upper portion 21 of the tubing. The stopper may then be inserted in the filled container and the entire assembly, including the container and its liquid contents, heated to a sterilizing temperature. To relieve excess pressure within the container formed by the heating of the liquid, the penetration of the bore 19 is usually effected at this time. This bore is of such restricted diameter that it is usually closed upon removal of the pressure due to the resilient nature of the rubber of the stopper, or it may be closed by snugly inserting the pin 20. In the embodiment of Fig. 4, the flap 34 is opened by the pressure within the container and resumes its normal closed position upon reduction of the pressure. The tubing 22 may then be folded as indicated in Figures 2 and 3 and the assembly and container again heated to a sterilizing temperature. The closure member 37 is then applied and the container in the form of a unitary package is ready for distribution. It will thus be seen that the container is in condition for immediate usage upon removal of the closure 37 and unfolding of the dispensing and air washing tubing 22 without further sterilization.

In operation the container is inverted as shown in Fig. 1, and the air washing chamber is filled with liquid from the container to approximately the extent shown in Fig. 1. This liquid serves as a filtering medium for the incoming air, and prior to the dispensing of the liquid through the tube 29, a portion of the liquid may enter the overflow chamber 25.

When the clamp 32 is released on the dispensing tube 31, a constant flow of liquid therethrough is assured by the admission of air through the air inlet tube 13. Air enters the container through the overflow chamber 25, the passage 26, and bubbles upwardly through the washing liquid within the air washing chamber 23, through the air inlet tube 13 and into the container. It will thus be seen that the air entering the container has been thoroughly cleansed of any dust, lint, spores or other foreign matter in passing with considerable ebullition through the washing liquid in the chamber 23. The provision of the overflow chamber 25, which may serve as an expansion chamber for the liquid in the air washing chamber, effectually removes any possibility of washing liquid being returned to the container by excess ebullition within the air washing chamber 23. In normal dispensing of the liquid, the liquid flowing into the overflow chamber 25 when the air washing chamber receives its charge upon inversion, returns to the air washing chamber 23. It will thus be seen that the injection needle is provided with a constant flow of liquid through the bore 17, the liquid outlet tube 29, the drip chamber 28, and the dispensing tubing 31.

The embodiments of Figures 7, 8 and 9 are somewhat similar to those previously described in that the device may be included in the form of a package with the liquid to be dispensed, and the dispensing tube (not shown) may be included within the cover shell 37. The rubber stopper 41 is provided with a flanged portion 42 resting on the end of the neck 10 of the container and is held in position by a collar 43 removably mounted on the threads 11 of the container neck. An air inlet tube 51 extending almost to the bottom of the container, is mounted in the stopper 41 and extends therethrough. A liquid outlet line 52 likewise is mounted in the stopper 41, extends slightly into the container and depends below the stopper and is provided with a beaded portion 53 adapted to receive a rubber dispensing tube 54.

In these embodiments the air washing chamber 71 is formed within a rubber tube 72 which may be somewhat similar to the ordinary finger cot. The tube depends from an annular flange 73 of the stopper member 41. Forming a portion of one side of the tube 72 is an auxiliary tube 74 connected to the air washing chamber by the passage 75 and forming an overflow chamber 76. In Fig. 9, the auxiliary tube is in the form of a separate rubber tube 77 housing the inner tube 72, is spaced therefrom to form an overflow chamber 80 and is adhered thereto at an upper portion 78. The inner tube 72 is likewise provided with an opening 79 forming a passage between the overflow chamber 80 and the air washing chamber 71. In Fig. 8, the device is shown in package form in that the tubes 71 and 74 are rolled up and retained in a rolled position by a strip 81 suitably secured to the bottom of the stopper member 41. It is also to be noted that a dispensing tube may be coiled within the cover shell 37, as shown in Fig. 10, in order that the dispensing device, the container and the liquid contents may be shipped in package form. In Fig. 9, the air inlet is provided with an enlarged portion 55 adapted to serve as a charging chamber. In the upright position of the container the charging chamber 55, as well as the portions of the tube 51, become filled with liquid and upon inversion this liquid flows into the air washing chamber 71.

In assembling the device, the container is first filled with liquid to the desired extent, and the upper portion of the tube 72 is then frictionally secured to the depending boss 73, and the stopper 41 is then inserted in the neck of the container. The collar 43 is then threaded onto the neck of the container, securing the stopper in position. The container, its liquid contents, and the air washing assembly are then heated to a sterilizing temperature, the liquid passage 52 remaining open to permit the escape of air and reduction of pressure within the container formed by the expansion of the air and liquid at the sterilizing temperature. The outer end of the liquid line 52 is then immediately sealed, as by the rubber seal 56, before the container cools, creating a pressure condition below atmospheric pressure within the container when it returns to room temperature.

Upon inversion of the container, as shown in Figs. 7 and 8, a portion of the liquid will flow into the chambers 72 and 74 from the air inlet tube 51, assuring an adequate supply of wash liquid for the incoming air. Upon dispensing of the liquid within the container through the dispensing tube 52, air will enter the open upper portion of the auxiliary tube 74, flow down through the expansion chamber 76, forcing a portion of the liquid back into the air washing chamber 71, and the air will then enter the air washing chamber 71 through the passage 75 and will then bubble through the wash liquid in this chamber, wherein it receives a thorough cleansing, and emerge through the tube 51 into the container.

The embodiment of Figs. 10 and 11 is somewhat similar to that shown in Figs. 7-9. In this embodiment, the stopper or plug member 85 is preferably disposed well within the neck of the container and does not extend beyond the neck of the container. The stopper is provided with a bore 86, to which is secured a dispensing tube 87 depending outside of the container in its inverted position from a boss 88, and a bore 89 adapted to supply air to the interior of the chamber during the liquid dispensing operation. As shown, the bores 86 and 89 are not provided with tubes extending into the container, as shown in Figs. 7-9, although it is to be understood that, if desired, such tubes may be provided, and likewise in the previously described embodiments the tubes may be omitted. The stopper is also provided with a third bore 90 of restricted diameter extending from the outer surface of the stopper 85 to a point adjacent the interior surface of the stopper. The bore may be extended into the interior of the container by penetration of the remainder of the stopper by a hollow needle adapted to transmit blood or blood plasma from a suitable source by means of the reduced pressure prevailing within the interior of the container while the outlets 86 and 89 are sealed. The pin 107 is preferably inserted in the bore 90 to prevent the deposition of dust, moisture, or other undesirable foreign substances therein and to provide a closure for the bore 90 when the bore is completed during the sterilization step to relieve excess pressure formed within the container as described in connection with the embodiment of Figs. 1-3. Thus, a saline, sugar or other solution within the container may be conveniently mixed with blood for transfusion purposes while in the sterile condition.

The lower end of the air inlet tube 89 is provided with a boss 91 forming a part of the stopper 85 and to which may be secured a tubular member 92 having an auxiliary tube 93 secured thereto to form a connected air washing chamber 94 and an overflow chamber 95. As shown, the tubular members are similar in construction to that shown in Fig. 7, although the construction shown in Fig. 8 may be employed if desired. The tubular members 92, 93 and 87 are preferably formed of a thin, flexible tubing such as rubber, moistureproof regenerated cellulose, cellulose acetate, Pliofilm, or like thin, flexible, plastic material. As shown in Fig. 10, the tubular washing members 92 and 93 may be rolled up to form a small package and secured to the stopper to form a seal. As shown, the dispensing tubing 87 is formed of rubber and is coiled within a closure 96 removably secured to the neck of the container. The tubing 87 may be formed of Pliofilm or some thin flexible material and be rolled upon itself to form a very small unit that will materially reduce the size of the self-contained package. When the tubing is formed of thin flexible material, partially to support the same when filled with liquid, a cord, preferably in the nature of a glazed fish line, may be secured longitudinally to the outer or inner surface of the tubing; for example, one end of the cord would be secured to the tubing 87 adjacent the boss 88, and the other end of the cord secured to the tubing at its lower end near the injection needle (not shown). Furthermore, to protect the tubing of thin flexible material from rupture, by means of the clamp (not shown) controlling the flow of liquid through the tubing, the upper portion of the tubing, comprising two inches or so in length depending from the boss 88, may be formed of rubber and the clamp mounted on this section; the Pliofilm portion of the tubing, which may be as long as four or five feet or more, is suitably secured to the lower portion of the rubber section. In operation, the device functions similarly to the embodiments of Figs. 7-9.

In the embodiments of Figs. 12-14, the stopper 85 is shown mounted within the neck of the container and is provided with bores 86, 89 and 90 similar in construction and function to those described in connection with Figs. 10 and 11. In this modification, the depending tubular members serving as outlet for the liquid to be dispensed and as an air inlet and air washing means are formed in an integral unitary assembly and are preferably cast or otherwise formed of the thin flexible material previously described, in order that the tubular members may be rolled to form a unitary sealed package somewhat similar to that shown in Fig. 10.

In the embodiment of Figs. 12 and 13, a depending tube 105 is fitted over a boss 97 on the lower surface of the stopper 85, the tube being divided by means of the wall 98 into two unconnected and segregated compartments 99 and 100, the tube 99 being in communication with the liquid outlet bore 86 and having secured at its lower end an extension dispensing tubing 101, although it is to be understood that the tubing 99 may be of sufficient length to eliminate the need of an extension tubing. The compartment 100 is in communication with the air inlet line 89 and serves as an air washing chamber and is provided with a passage 102 at the lower end of the chamber, connecting it with an overflow chamber 103 open to the atmosphere and formed by the tubing 104 secured to the tubular member 105.

The embodiment of Fig. 14 is similar to that of Figs. 12 and 13 except that the liquid outlet tube 106 extends through the interior of the air washing chamber 100, although it is to be understood that there is no communication between these members.

In usage, the embodiments of Figs. 12 and 14 are assembled and operate during dispensing in a manner similar to the embodiments of Figs. 7-9 and, accordingly, this description need not be repeated.

It is to be noted that in all of the embodiments there is no possibility of the washing fluid becoming commingled with the sterile liquid to be dispensed, as in some of the devices known to the art. Likewise, in all of the embodiments it will be understood that the size of the fluid outlet is related to the size of the air inlet, so that the rate of flow of liquid from the dispensing tubes will maintain a balanced condition.

While the novelty of the construction has been emphasized in the field of medicine, it will be understood that my improved device is not limited to such use, but that the dispensing device has a wide field of utility, which will be readily appreciated by those skilled in the art.

As apparent from the foregoing description, a particular advantage of the improved self-contained package is that, unlike similar devices, the interior of the container is not open to the atmosphere until the device is ready for use in the inverted position, since there is no outer core to be removed or cap to be added, thereby eliminating the possibility of contamination of the liquid to be dispensed prior to the dispensing of the liquid, due to inrush of unwashed air, particularly when a reduced pressure prevails within the container. It is also to be noted that when the dispensing tubing 87 is formed of a thin flexible material, such as Pliofilm, it is thrown away after each use, thereby eliminating another potential source of contamination in that the ordinary rubber tubing is customarily re-used many times.

What I claim is:

1. In combination with a container having an open neck, a stopper removably secured in the neck of said container, a liquid outlet line mounted on said stopper, an air inlet line extending through said stopper to the interior of said container, and interconnected hollow flexible foldable members mounted below said stopper in the inverted position of said container, one of said members being open to the atmosphere during the dispensing operation and the other of said members serving as an air washing chamber and being connected to said air inlet line.

2. In combination with a container operable upon inversion, a stopper carried in the neck of said container, a liquid outlet line extending through said stopper, an air inlet line extending through said stopper into the interior of said container, a hollow flexible member disposed below said air inlet tube in the inverted position of said container and forming an air washing chamber, and an auxiliary hollow flexible member secured to said first mentioned member and having an opening into said air washing chamber, said second mentioned member being open to the atmosphere.

3. In combination with a container operable upon inversion, a stopper carried in the neck of said container, a liquid outlet line extending through said stopper, an air inlet line extending through said stopper into the interior of said container, a hollow flexible member disposed below said air inlet tube in the inverted position of said container and forming an air washing chamber, a second hollow flexible member enclosing said first mentioned member and secured thereto, and an opening in said first mentioned member connecting said second member and said air washing chamber.

4. In combination with a container having an open neck, a stopper removably secured in the neck of said container, a liquid outlet line extending through said stopper, an air inlet tube extending through said stopper into the interior of said container, a pair of interconnected hollow flexible members mounted below said stopper in the inverted position of said container, one of said members being open to the atmosphere during the dispensing operation and the other of said members serving as an air washing chamber, said members being adapted to be tightly rolled to form a seal for the air inlet tube prior to dispensing of the liquid contents of the container, and a closure housing said rolled members and forming a pre-sterilized package including the container, its liquid contents and the air washing and dispensing assembly.

5. In combination with a container having an open neck, an air washing and liquid dispensing assembly adapted to form a unitary package with said container in which the interior of the container in its packaged condition is below atmospheric pressure and including a stopper removably inserted in the neck of said container and provided with a depending boss, a liquid outlet line extending through said stopper and said boss, an air inlet line extending through said stopper and said boss, a bore of restricted diameter extending partially through said stopper from the exterior thereof adapted to receive a hollow needle to penetrate said stopper and supply additional liquid to said container in its sealed condition by reason of the reduced pressure within said container, and tubular members of flexible material depending from said boss and adapted to be rolled, one of said members being in communication with said liquid outlet line and serving as an extension thereof, the other of said tubular members being connected to said air inlet line and having an opening to the atmosphere to serve as an air washing chamber for incoming air.

6. In combination with a container having an open neck, a stopper removably disposed in the neck of said container, a liquid outlet line and an air inlet line extending through said stopper and spaced apart, and a tubular member formed of resilient material depending from said stopper and provided with a plurality of compartments, one of said compartments being in communication with said liquid outlet line and serving as a liquid dispensing tube, the other compartment being in communication with said air inlet line and providing an air washing chamber for incoming air, said tubular member being adapted to be tightly rolled to form a seal for the air inlet line and the liquid dispensing line prior to the dispensing of the liquid contents of the container.

7. In combination with a container having an open neck, a stopper removably disposed within the neck of the container and provided with a depending boss, a liquid outlet line and an air inlet line extending through said stopper and said boss and spaced from each other, and a tubular member of flexible material depending from said boss and provided with a plurality of compartments, one of said compartments being in communication with said air inlet line and the atmosphere and being adapted to receive a portion of the liquid to be dispensed as a medium for washing incoming air, the other compartment being in communication with said liquid dispensing line and extending through said first mentioned compartment as a liquid dispensing tube, said tubular member being rollable to form a seal for the air inlet line and the liquid dispensing line prior to the dispensing operation.

8. In combination with a container having an open neck and operable upon inversion, a plug disposed in the neck of said container, a liquid outlet extending through said plug from the interior of said container, an air inlet line extending through said plug to the interior of said container and spaced from said liquid outlet, a flexible foldable hollow member depending from said plug below said air inlet line forming an air washing chamber for incoming air adapted to receive a portion of the liquid within said container to serve as an air washing medium, and an air inlet tube open to the atmosphere and opening into said air washing chamber below the normal liquid level therein.

9. A self-contained fluid container and dispensing device operable upon inversion comprising, in combination with said container, a stopper mounted in the neck of said container, an air inlet and a liquid outlet extending through said stopper in spaced relation, tubing depending from said stopper in the inverted position of said container and communicating with said air inlet, said tubing including an air washing chamber adapted to receive a portion of the liquid to be dispensed upon inversion of the container to serve as a medium for washing incoming air, and an adjacent overflow chamber having a passage into the air washing chamber near the bottom thereof, and a liquid outlet tube communicating with the liquid outlet line through said stopper, said tubing and said liquid outlet tube being formed of thin flexible material adapted to be rolled to form a compact package nested above the neck of the container prior to the dispensing operation.

10. A self-contained fluid container and dispensing device operable upon inversion comprising, in combination with said container, a stopper mounted in the neck of said container, an air inlet and a liquid outlet extending through said stopper in spaced relation, tubing depending from said stopper in the inverted position of said container and communicating with said air inlet, said tubing including an air washing chamber adapted to receive a portion of the liquid to be dispensed upon inversion of the container to serve as a medium for washing incoming air, and an adjacent overflow chamber having a passage into the air washing chamber near the bottom thereof, and a liquid outlet tube extending through said air washing chamber and having an extension depending below said air washing chamber, said tubing and said liquid outlet tube being formed of thin flexible material adapted to be rolled to form a compact package nested above the neck of the container prior to the dispensing operation.

11. A self-contained fluid container and dispensing device operable upon inversion comprising, in combination with said container, a stopper mounted in the neck of said container, an air inlet and a liquid outlet extending through said stopper in spaced relation, tubing depending from said stopper in the inverted position of said container and communicating with said air inlet, said tubing including an air washing chamber adapted to receive a portion of the liquid to be dispensed upon inversion of the container to serve as a medium for washing incoming air, and an adjacent overflow chamber having a passage into the air washing chamber near the bottom thereof, and a drip chamber disposed below said air washing chamber; and a liquid outlet tube communicating with the liquid outlet line through said stopper, extending through said air washing chamber and entering said drip chamber, and a liquid conduit leading from said drip chamber; said liquid conduit, liquid outlet line and tubing being formed of thin flexible material adapted to be rolled upon itself to form a compact package disposed above the neck of the container prior to the dispensing operation, and a closure fitting over the neck of said container adapted to enclose and retain said dispensing assembly in sterile condition.

12. In combination with a container having an open neck, an air washing and liquid dispensing assembly adapted to form a unitary package with said container, comprising a stopper removably inserted in the neck of said container, a liquid outlet line and an air inlet line extending through said stopper in spaced relation, a bore of restricted diameter extending partially through said stopper from the exterior thereof adapted to be extended to the interior of said container to reduce excess pressure therein, a flap on the exterior of said stopper normally closing said bore and adapted to be opened upon the formation of excess pressure within said container, and tubular members of flexible material depending from said stopper and adapted to be rolled to form a compact bundle above the neck of said container, one of said members being in communication with said liquid outlet line and serving as an extension thereof, the other of said tubular members being connected to said air inlet line and having an opening to the atmosphere to serve as an air washing chamber for incoming air.

13. A self-contained fluid container and dispensing assembly operable upon inversion comprising a stopper carried in the neck of said container, a liquid outlet line extending through said stopper, an air inlet line extending through said stopper and spaced from said liquid outlet line, a liquid outlet tube connected to said liquid outlet line, an air washing chamber disposed below said air inlet line in the inverted position of said container and communicating therewith, said chamber being adapted to receive a portion of the liquid to be dispensed to serve as an air washing medium, said air washing chamber and said liquid outlet tube being formed of thin flexible material of the group consisting of cellulose acetate, rubber hydrochloride, moistureproof regenerated cellulose or rubber and being adapted to be rolled together to form a compact package above the neck of said container and a seal for said air inlet line and liquid outlet line prior to the dispensing operation.

14. In combination with a container having an open neck, an air washing and liquid dispensing assembly adapted to form a unitary package with said container, comprising a stopper removably inserted in the neck of said container, a liquid outlet line and an air inlet line extending through said stopper in spaced relation, a bore of restricted diameter extending partially through said stopper from the exterior thereof adapted to be extended to the interior of said container to reduce excess pressure therein, and tubular members of flexible material depending from said stopper and adapted to be rolled to form a compact bundle above the neck of said container and a seal for said liquid outlet line and said air inlet line, one of said members being in communication with said liquid outlet line and serving as an extension thereof, the other of said tubular members being connected to said air inlet line and having an opening to the atmosphere to serve as an air washing chamber for incoming air.

15. In combination with a container having an open neck, an air washing and liquid dispensing assembly adapted to form a unitary package with said container, comprising a stopper inserted in the neck of said container, a liquid outlet line and an air inlet line extending through said stopper in spaced relation, and tubular members of thin flexible homogeneous seamless transparent material depending from said stopper and adapted to be rolled to form a compact bundle and a seal above the neck of said container, one of said members in its unrolled position being in communication with said liquid outlet line and serving as an extension thereof to an injection needle, the other of said tubular members being connected to said air inlet line in its unrolled position and having an opening to the atmosphere to serve as an air washing chamber for incoming air, said members in their unrolled position being flexible and free of joints to avoid deposit of moisture and foreign bodies.

16. In combination with a container having an open neck, an air washing and liquid dispensing assembly adapted to form a unitary package with said container, comprising a stopper inserted in the neck of said container, a liquid outlet line and an air inlet line extending through said stopper in spaced relation, a liquid dispensing tube extending from said liquid outlet line to an injection needle, a tubular member depending from said air inlet line in the inverted position of said container having an opening to the atmosphere and a chamber serving as an air washing chamber for incoming air, said chamber being adapted to receive a portion of the liquid to be dispensed to serve as an air washing medium, said liquid dispensing tube and said tubular member being formed of thin flexible homogeneous material, being adapted to form a seamless passage with a relatively small number of joints from said stopper to said injection needle in the inverted position of said container, and adapted to be rolled to form a compact package above the neck of said container and a seal for said liquid outlet line and air inlet line prior to the dispensing operation.

17. In combination with a container having an open neck, an air washing and liquid dispensing assembly adapted to be mounted above the container in its upright position after the closure cap for said container has been removed, comprising a stopper removably inserted in the neck of the container, a liquid outlet line and an air inlet line extending through said stopper in spaced relation, a liquid dispensing tube extending from said liquid outlet line to an injection needle, a tubular member depending from said air inlet line in the inverted position of said container having an opening to the atmosphere and a chamber serving as an air washing chamber for incoming air, said chamber being adapted to receive a portion of the liquid to be dispensed to serve as an air washing medium, said liquid dispensing tube and said tubular member being formed of thin flexible foldable homogeneous material, being adapted to form a seamless passage with a relatively small number of joints from said stopper to said injection needle in the inverted position of said container.

MARTIN C. SCHWAB.